April 2, 1946.　　　E. K. RALSTON　　　2,397,502
VALVE ROTATING DEVICE
Filed Oct. 26, 1944　　　3 Sheets-Sheet 2
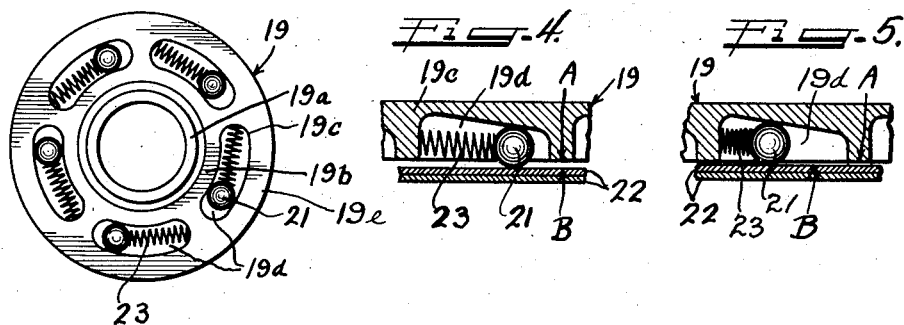
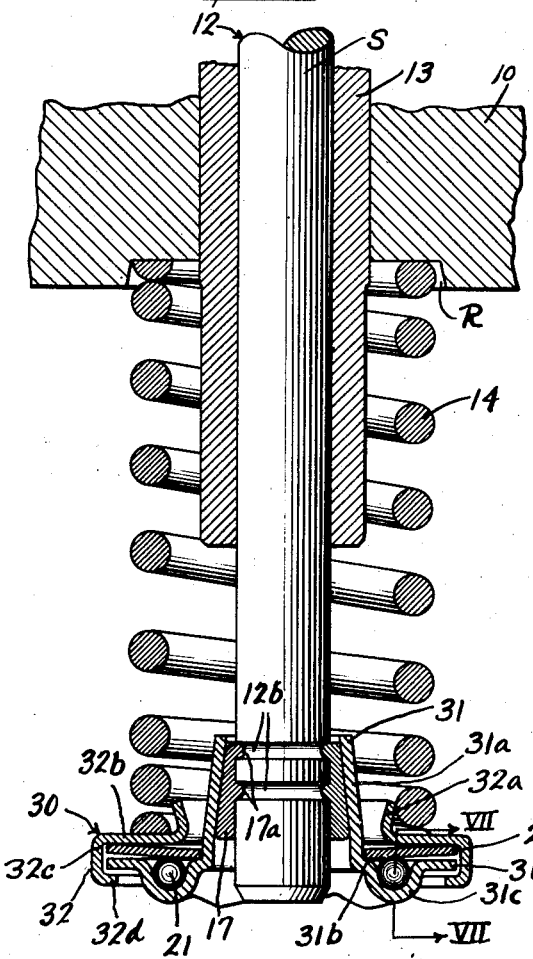
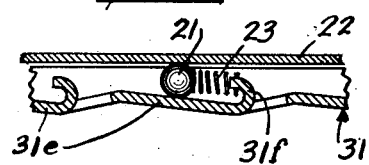
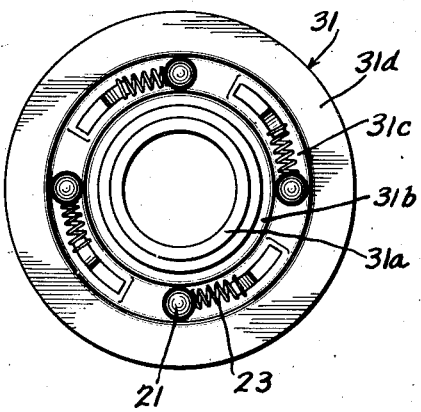
Inventor
ELDON K. RALSTON.

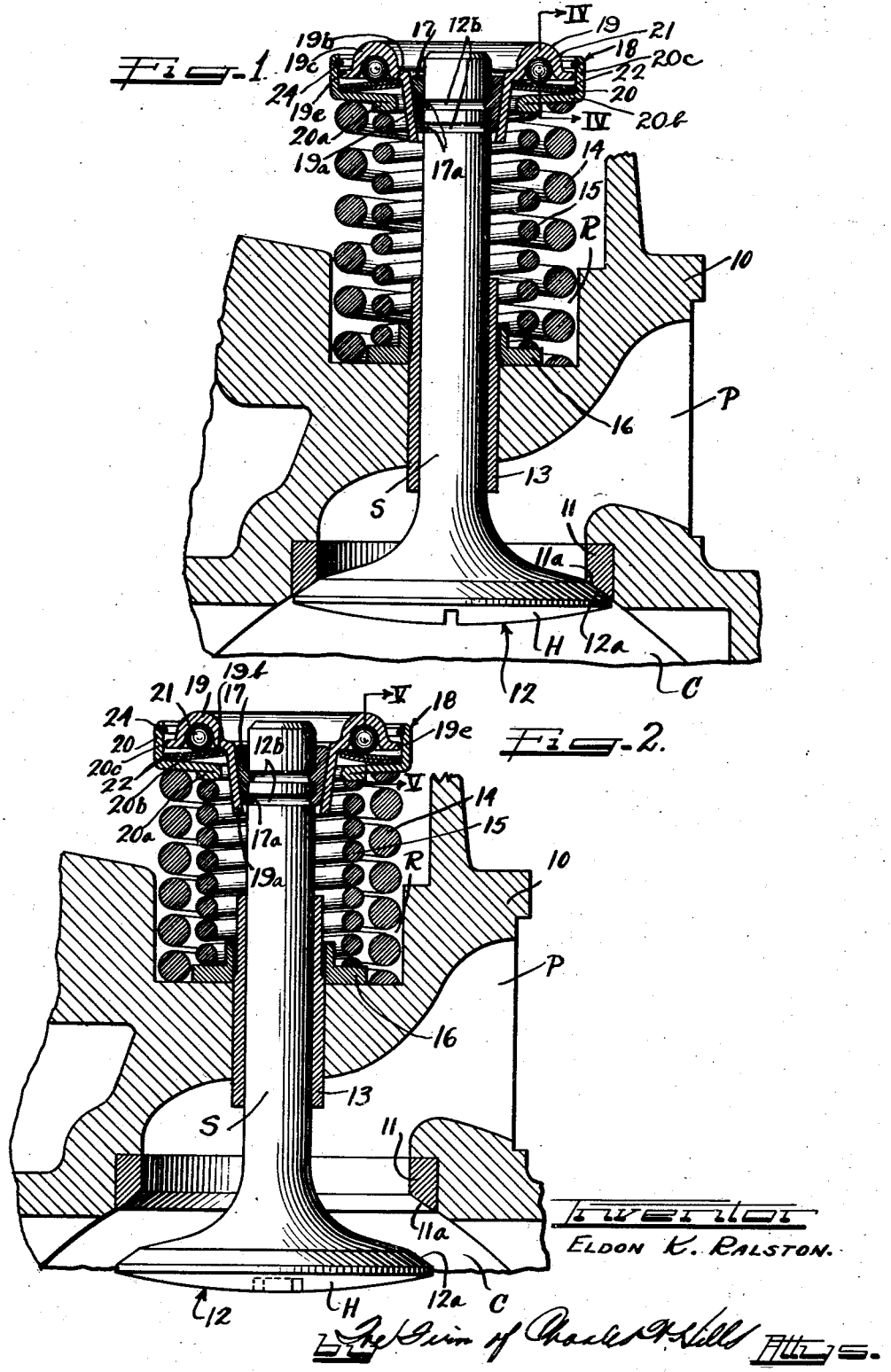

April 2, 1946.  E. K. RALSTON  2,397,502
VALVE ROTATING DEVICE
Filed Oct. 26, 1944  3 Sheets-Sheet 3
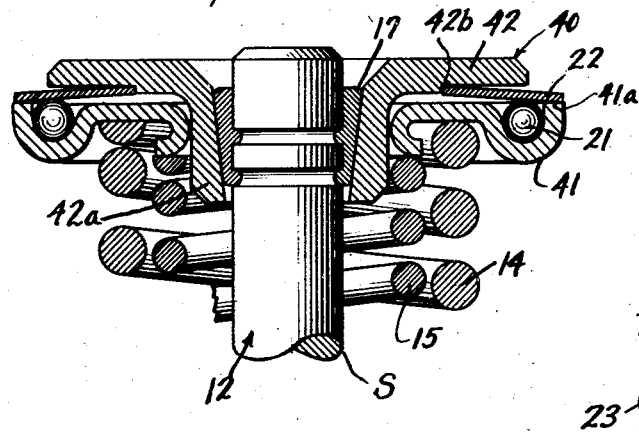
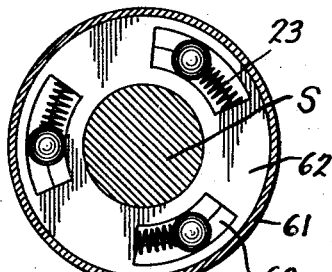
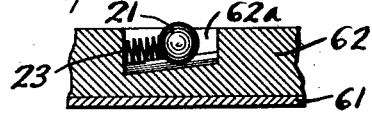
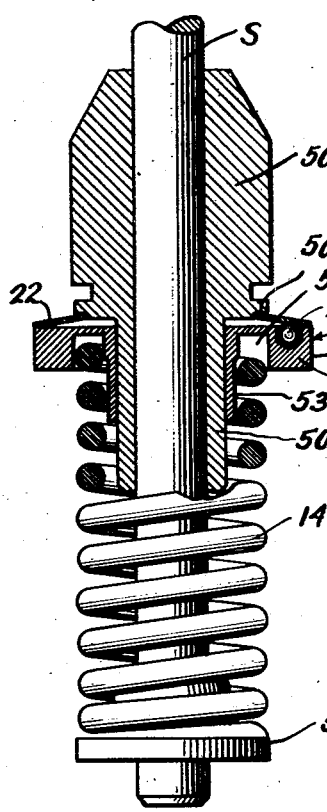
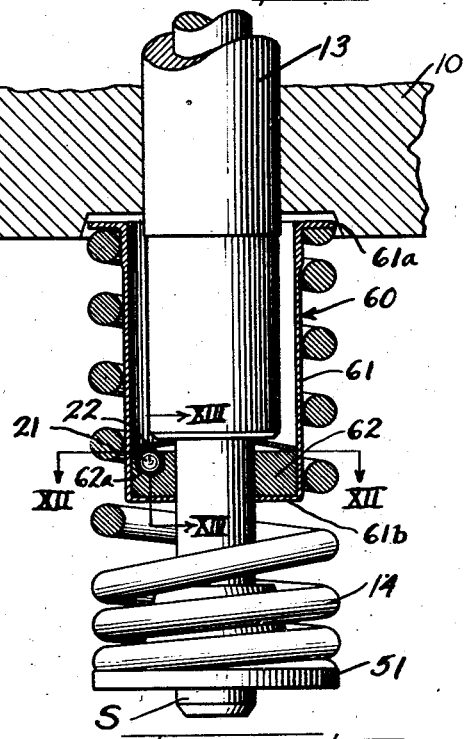
Inventor
ELDON K. RALSTON.

Patented Apr. 2, 1946

2,397,502

UNITED STATES PATENT OFFICE 2,397,502

VALVE ROTATING DEVICE

Eldon K. Ralston, Cleveland Heights, Ohio, assignor to Thompson Products, Inc., Cleveland, Ohio, a corporation of Ohio Application October 26, 1944, Serial No. 560,516

17 Claims. (Cl. 123—188)

This invention relates to devices for rotating valves and specifically deals with readily installed compact self-contained units for rotating poppet valves each time the valve heads are raised from their seats.

While the invention will be hereinafter specifically described in connection with devices for rotating poppet valves, it should be understood that the devices of this invention are not limited to any particular usage since they are capable of imparting rotating movements to any rotatable member and especially spring loaded rotatable members.

According to this invention the conventional spring retainer of a spring pressed poppet valve is replaced with an assembly including a retainer cap carrying shiftable elements such as balls, rollers, wedges or the like, and a resilient member which will deflect under increased load to transfer the spring load from the retainer cap to the shiftable elements whereupon the load on the shiftable elements causes them to shift and produce relative rotation between the retainer cap and an adjacent non-rotatable part. The retainer cap is fixed against relative rotation on the valve and the thus-produced relative rotation between the retainer cap and the stationary part causes the valve to rotate. The increased load is placed on the resilient member each time the valve head is raised off of its seat, since the valve spring is then placed under a higher load which must be borne by the deflectible member.

The rotation of poppet valves during operation of internal combustion engines and the like keeps the valve seat and the valve stem free from carbon and the like deleterious substances. Furthermore, even seat wear is obtained.

It is, then, an object of the present invention to provide small, compact self-contained valve-rotating devices.

A further object of the invention is to provide poppet valve-rotating devices which only rotate a poppet valve when the same is lifted off of its seat, to prevent serious wear of the valve head and seat.

A still further object of the invention is to provide valve-rotating devices which operate by a change in valve spring pressure and require no connections or attachments to other parts of an engine.

A still further object of the invention is to provide poppet valve-rotating devices which are self-contained and do not depend on inertia-operated parts.

A still further object of this invention is to provide a poppet valve-rotating mechanism that can be substituted for standard engine parts without requiring any changes in the design or operation of the other parts of the engine.

A specific object of the invention is to provide mechanism for effecting relative rotation between two parts upon change of loads on one of the parts sufficient to flatten or otherwise deflect a spring washer.

Other and further objects of the invention will be apparent to those skilled in the art from the following detailed description of the annexed sheets of drawings which, by way of preferred examples, illustrate several embodiments of the invention.

On the drawings:

Figure 1 is a vertical cross-sectional view, with parts in elevation, of a poppet valve assembly equipped with one form of valve-rotating device according to this invention.

Figure 2 is a view similar to Figure 1, but illustrating the positions of the parts when the valve is opened.

Figure 3 is a plan view of the retainer cap shown in Figures 1 and 2.

Figure 4 is a fragmentary vertical cross-sectional view taken along the line IV—IV of Figure 1, and diagrammatically illustrating the relative positions of the parts.

Figure 5 is a view similar to Figure 4 but taken along the line V—V of Figure 2 and illustrating the shifted positions of the parts when the valve is opened.

Figure 6 is a fragmentary vertical cross-sectional view, with parts in elevation, of a valve assembly equipped with a modified form of valve-rotating device according to this invention.

Figure 7 is a fragmentary vertical cross-sectional view taken along the line VII—VII of Figure 6.

Figure 8 is a plan view of the retainer cap of the device of Figure 6.

Figure 9 is a fragmentary vertical cross-sectional view, with parts in elevation, of a valve assembly equipped with another modified form of valve-rotating device according to this invention.

Figure 10 is a fragmentary vertical cross-sectional view, with parts in elevation, of a valve assembly equipped with still another form of rotating device according to this invention.

Figure 11 is a fragmentary vertical cross-sectional view, with parts in elevation, of a valve assembly equipped with a still further modified form of valve-rotating device according to this invention.

Figure 12 is a horizontal cross-sectional view, with parts in plan, taken along the line XII—XII of Figure 11.

Figure 13 is a fragmentary vertical cross-sectional view, with parts in side elevation, taken along the line XIII—XIII of Figure 11.

As shown on the drawings:

In Figures 1 and 2, the reference numeral 10 designates an engine part such as, for example, a portion of the cylinder head of a radial type aircraft engine. The engine part 10 defines a combustion chamber C and a port P, such as an exhaust port. A seat ring 11 is secured in the mouth of the port P and has a beveled seating face 11a facing the combustion chamber C. A poppet valve 12 has a head H for closing the port P. The head H has a beveled seating face 12a coacting with the seat 11a of the ring. The stem S of the valve 12 is slidably mounted in a stem guide 13 carried by the engine part 10. The stem guide projects from the port P through a wall of the engine part into a recess R in the engine part 10. A heavy valve spring 14 is bottomed on the bottom of the recess R and a lighter valve spring 15 nested in the spring 14 is bottomed on a seat member 16 embracing the projecting end of the guide 13 and, in turn, bottomed on the bottom of the recess R.

The valve stem S has the conventional retainer lock grooves 12b therearound near the tip end thereof and these grooves coact with the beads 17a of retainer locks 17. A valve-rotating device 18 of this invention is interposed between the retainer locks 17 and the springs 14 and 15 for automatically rotating the valve 12 relative to the engine part 10 each time the valve is opened.

The valve-rotating device 18 is composed of a retainer cap 19 locked on the valve stem S by the retainer lock 17, a valve spring seating collar 20 acted on by the springs 14 and 15, a plurality of balls 21 carried in inclined grooves in the retainer cap 19, and spring washers 22 between the retainer cap and spring collar arranged to deflect under increased spring loads as when the valve is opened to transfer the spring load from the retainer cap to the balls in the cap. The transferred load causes the balls to roll down the inclined grooves and thereby rotates the retainer cap 19 which, in turn, rotates the valve 12.

The retainer cap 19 has a central tapered collar portion 19a receiving the retainer locks 17 and coacting therewith to secure the cap on the valve stem. An annular shoulder 19b is provided at the divergent end of the tapered collar 19a to be abutted by the inner peripheral portion of the top spring washer 22. Two superimposed spring washers 22 are illustrated, but it should be understood that one, or any number, can be used to obtain the desired degree of stiffness for deflecting or bowing radially over the balls 21 to transfer the main load from the shoulder 19b to the balls only when the load of the springs 14 and 15 increases, as when the valve is opened.

As best shown in Figure 3, the retainer cap 19 has an annular housing portion 19c surrounding the shoulder 19b and containing a plurality of grooves 19d defining races for the balls 21. The ball races have inclined bottoms, as best shown in Figures 4 and 5, and coil springs 23 act on the balls to urge them to the shallow ends of the grooves. The balls thus normally tend to roll to the shallow ends of the grooves. As shown in Figures 4 and 5, each groove 19d is separated by interposed wall portions of the housing 19c.

As best shown in Figures 1 and 2, the retainer cap 19 has an outturned annular flange 19e beyond the housing part 19c.

The valve spring seat collar 20 has a central aperture defined by a turned-back wall portion 20a. The aperture freely receives the collar 19a of the retainer cap. The turned-back wall portion 20a receives the inner spring 15 thereon. The collar has an end wall 20b on which the outer spring 14 is bottomed and on which the outer peripheral portion of the spring washer bears. An upstanding skirt 20c of the collar 20 embraces the flange 19e of the retainer cap and has a groove therein receiving a locking wire 24 to hold the parts in assembled relation for installation purposes. The locking wire has no function in the operation of the device. The locking wire will not permit passage of the flange 19e out of the collar 20c.

From the above descriptions it will be understood that when the poppet valve head is seated on the seat ring, so that the valve is in closed position, the load imposed on the valve-rotating device 18 by the springs 14 and 15 is insufficient to bow or deflect the washer 22 over the balls 21 to take the major portion of the load off of the shoulder 19b of retainer cap 19. In this position, the spring washers 22 transfer the load of the springs 14 and 15 from the valve spring seat collar 20 directly to the retainer cap 19 and the coiled springs 23 will urge the balls 21 into the shallow ends of the grooves 19d until they snugly contact the spring washer.

When the poppet valve 12 is raised off of its seat to open the port P, the valve springs 14 and 15 are compressed and the load on the spring washer or washers 22 is increased beyond the flexing point of the washer. The washer will then be bowed or deflected radially to bear heavily on the balls 21 and the inner peripheral portion of the washer will only lightly engage the shoulder 19b of the retainer cap 19. The main load is thus transferred to the balls 21. When the spring load is transferred to the balls, they roll down into the deeper ends of the grooves 19d. Since the washer 22 cannot rotate because it is held against rotation by the valve springs 14 and 15, the retainer cap 19 will be rotated by the rolling balls, thereby driving the valve and causing it to rotate.

As indicated by the arrows A and B in Figures 4 and 5, the retainer cap 19 is shifted relative to the washers 22 for an appreciable distance in a direction to align the point B on the washers with a deeper part of the grooves 19d. The amount of shifting can be controlled by the angle of inclination of the grooves.

In the embodiment illustrated in Figure 6, parts equivalent to parts described in Figures 1 and 2 have been identified by the same reference numerals.

The embodiment of Figure 6 illustrates a typical valve-rotating device 30 for use with a single valve spring 14. The device 30 includes a retainer cap 31 having a tapered collar portion 31a receiving the retainer locks 17 and secured thereby to the valve stem S. The retainer cap 31 is of stamped metal construction and has an outturned shoulder 31b at the base of the tapered collar 31a together with an annular housing portion 31c surrounding the shoulder 31b and an outturned flange 31d projecting radially from the housing portion 31c.

As shown in Figures 7 and 8, the annular housing portion 31c has a plurality of inclined bottom sections 31e separated by curled tang portions 31f struck up from the bottoms to form anchors receiving one end of the coiled springs 23 for the balls 21. The balls 21 are urged toward the upper end of the inclined portion 31e by the spring 23 as described above. A valve spring retainer seat 32 has a collar portion 32a defining an aperture freely receiving the collar 31a of the retainer 31 and also forming a centering projection for the end coils of the valve spring 14. An end wall 32b of the valve spring seat collar bottoms the valve spring 14 and a skirt 32c depends from this wall 32b to embrace the spring washer 22 and the flange 31d of the retainer cap. An inwardly spun flange portion 32d overlies the flange 31d to hold the parts in assembled relationship.

The collar portion 32a of the spring seat 32 has a tight fit with the end coils of the valve spring 14 so that the spring will prevent rotation of the seat collar 32.

The device 30 operates the same as the device 18.

In the modification of Figure 9, parts substantially identical with parts described in connection with Figures 1 and 2 have been marked with the same reference numerals.

The valve rotating device 40 of Figure 9 includes a valve spring seat collar 41 which contains the races or grooves for the balls 21. This arrangement decreases the overall height of the assembly, since the ball races are outside of the valve spring at levels below the end of the heavy valve spring 14.

The device 40 includes a retainer cap 42 which only functions to provide a seat for the spring washer 22. The retainer cap 42 is locked on the valve stem S by means of the retainer locks 17, and for this purpose has a collar portion 42a with a tapered bore receiving the locks 17. A shoulder 42b is provided to seat the inner peripheral portion of the spring washer 22.

The valve spring seat 41, besides having the ball races for the balls 21, has an abutment face 41a for the outer peripheral portion of the spring washer 22. As in the other forms of the invention, when the spring washer 22 transfers the spring load from the spring seat 41 to the retainer cap 42, springs (not shown) roll the balls 21 into the shallow ends of the grooves to snugly engage the washer.

When the valve 12 is opened and the springs 14 and 15 are compressed to flatten the spring washer 22 and cause it to bear heavily on the balls 21 and only lightly on the face 41a, the balls 21 will tend to roll into the deeper parts of their races thereby rotating the spring washer 22 which, in turn, rotates the retainer cap 40 because the spring seat collar 41 is held against rotation by the springs.

In the modification of Figure 10, the valve spring seating collar is omitted and the retainer cap rotates the valve spring to rotate the valve.

As shown in Figure 10, the valve stem S is slidably and rotatably mounted in a guide 50 having an abutment shoulder 50a. The valve spring 14 is held on the valve stem by means of a conventional retainer 51. The valve-rotating device 52 includes a retainer cap 53 with a collar portion 53a slidably and rotatably mounted on a projecting portion 50b of the guide 50 below the abutment shoulder 50a.

The retainer cap 53 has a groove 53b receiving the end coil of the valve spring 14 therein. The valve spring 14 embraces the collar 53a.

The retainer has a housing portion 53c with inclined ball races therein receiving the balls 21.

A spring washer 22 has the inner peripheral portion thereof bottomed on the shoulder 50a of the guide 50 and the outer peripheral portion bottomed on the retainer cap 53 when the valve is in closed position and bottomed on the balls 21 when the valve is open. The flattening of the spring washer transfers the load of the spring 14 to the balls 21 and causes the balls to roll into the deeper ends of the groove thereby rotating the retainer 53 and driving the spring 14 to rotate the retainer 51 and thereby rotate the valve stem S. When the valve is closed and the spring washer again seated on the retainer cap 53, springs (not shown) return the balls 21 to the shallow ends of their grooves to snugly engage the washer.

In the modification of the invention shown in Figures 11 to 13 the retainer cap fits inside of the valve spring 14 and the spring washer seats against the valve guide. The retainer cap rotates the valve spring which, in turn, rotates the valve as described in connection with Figure 10.

As shown in Figures 11 to 13, the valve stem S has a conventional spring retainer 51 for the valve spring 14. An engine part 10 has a valve guide 13 projecting therefrom and receiving the valve stem S therethrough in slidable and rotatable relation.

A valve-rotating device 60 according to this invention includes a retainer-cap composed of a hollow cup member 61 disposed inside of the valve spring 14 and freely embracing the projecting portion of the guide 13. The cup 61 has an outturned flange 61a bottoming the valve spring 14. The cup 60 has an apertured bottom wall 61b receiving the valve stem S therethrough.

A ring 62 is disposed in the cup 60 and has ball races 62a therein at spaced intervals therearound receiving the balls 21. A spring washer 22 has the inner peripheral portion thereof bottomed on the end of the guide 13 and the outer peripheral portion bottomed on the top of the ring 62 but arranged to be bottomed on the balls 21 when the washer is flattened.

The cup 61 and ring 62 together constitute a retainer cap and the ball races 62a in the ring preferably have bottoms that are transversely as well as longitudinally inclined so that the balls 21 ride on the inclined walls of a trough.

The balls, as described above, are spring-pressed toward the shallow ends of the races 62a by means of coil springs 23.

When the valve is open and the spring 14 compressed to increase the load on the spring washer 22, the washer will be flattened to bear on the balls 21 thereby rotating the ring 62 and cup 61. The cup 61 drives the valve spring 14 and the spring 14, in turn, rotates the retainer 51 to rotate the valve stem S.

The various illustrated modifications of the invention show that the devices of this invention are designed to fit at either end of the valve spring. Thus in the modifications of Figures 1 to 9, the valve-rotating devices are interposed at the end of the valve spring adjacent the tip end of the valve stem, while in the modifications of Figures 10 to 13 the valve rotating devices are interposed between that end of the valve spring which is adjacent the engine part.

The spring washers 22 used in each of the rotating devices are preferably conical in shape when in a free state, and are bowed when loaded beyond a predetermined amount. However, any resilient member which will deflect under an increase in valve spring load to transfer the load from an original point of support to the shiftable members such as the balls 21 can be used.

Each of the illustrated valve-rotating devices is equipped with balls 21. However, it should be understood that rollers, wedges or the like shiftable devices could be used.

Coil springs 23 have been illustrated to return the balls 21 to the shallow parts of the grooves. Other types of springs or returning devices such as leaf springs, cantilever springs or the like could be used in place of coil springs.

It should be understood from the above descriptions that the invention provides compact, self-contained devices causing rotation upon being subjected to increased loads sufficient to deflect a resilient member which transfers the increased loads to shiftable elements arranged so that the thus transferred load thereon causes them to rotatably drive another part.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A device for effecting relative rotation between two parts when subjected to increased loads which comprises adjacent relatively rotatable parts, a resilient member connecting said relatively rotatable parts, and shiftable elements acting on said resilient member arranged to rotatively drive one of the adjacent parts relative to the other part whenever the resilient member is deflected.

2. A device for effecting rotation whenever it is subjected to increased loads which comprises a first part, means for loading said first part, a second part rotatively mounted relative to said first part, a deflectable member interposed between said parts and arranged to transfer the load from said first part to said second part, and shiftable elements in said second part acting on said deflectable member arranged to rotatively drive said second part whenever the load on said first part is increased sufficiently to deflect said deflectable member for bearing only lightly on the second part.

3. A device for rotatively driving one part relative to another part whenever the device is subjected to increased longitudinally applied loads which comprises a first part, means longitudinally loading said first part, a second part, a deflectable member interposed between said parts and transferring the load on the first part to the second part, and shiftable elements between said deflectable member and one of said parts arranged to rotatively drive one of the parts whenever the longitudinal load on the first part is increased sufficiently to deflect said deflectable member for bearing heavily on the shiftable elements and only lightly on said second part.

4. A valve rotating device comprising a first part arranged to receive the load of the valve spring, a second part coacting with said first part, a deflectable member between the parts normally in engagement with both parts to convey the spring load to the second part, and shiftable members between the deflectable member and one of the parts arranged to drive one of the parts in a rotative direction for rotating the valve whenever the deflectable member is deflected relative to one of the parts under increased spring load to transfer the load to said shiftable elements.

5. A valve rotating device adapted for installation on a valve assembly without changing the design or operation of the assembly which comprises a first part arranged for corotation with a valve, a second part held against rotative movement, a deflectable resilient member connecting said first and second parts, and shiftable means associated with said first part arranged to be engaged by said deflectable resilient member and rotatably drive the first part whenever said member is deflected.

6. A poppet valve rotating device adapted to rotatively drive a poppet valve each time it is lifted off of its seat which comprises a first part connected to said poppet valve for corotation therewith, a second part held against rotation, a deflectable spring member normally engaging both said first part and said second part, said first part having inclined raceways associated therewith, shiftable elements riding on said inclined raceways, spring means acting on said shiftable elements to urge the same against said deflectable spring member, and said deflectable spring member arranged to transfer the valve spring load of a valve assembly to said shiftable elements each time the valve is opened for forcing the shiftable elements into the deeper parts of the inclined raceways and thereby rotate the first part together with the valve.

7. A poppet valve rotating device comprising a retainer cap having a collar portion arranged to receive valve spring retainer locks and a housing portion having inclined raceways disposed circumferentially around said collar portion, balls in said raceways, springs urging said balls toward the shallow ends of the raceways, a spring seat member receiving the collar portion of the retainer cap freely therethrough and having a skirt embracing the housing portion of the retainer cap, a spring washer interposed between said spring seat and said retainer cap arranged to transfer spring loads on the spring seat to said retainer cap and arranged to be deflected by increased spring loads when the valve is operated for transferring the increased loads to said balls whereupon said balls will roll into the deeper ends of the raceways and rotate the retainer cap.

8. A poppet valve rotating device adapted to replace a valve spring retainer which comprises a retainer cap arranged for attachment to a valve stem and having a plurality of circumferentially arranged inclined raceways, balls in said raceways, springs urging said balls to the shallow ends of the raceways, a spring seat coacting with said retainer cap and adapted to bottom the spring of a valve assembly, and a spring washer interposed between the spring seat and the retainer cap arranged to transfer the spring load of the valve assembly to the retainer cap whenever the valve is closed and arranged to deflect under increased loads when the valve is opened to transfer the load to the balls for urging the balls into the deeper parts of the raceways thereby rotating the retainer cap.

9. A poppet valve assembly comprising an engine part having a valve seat, a poppet valve having a stem slidable in said engine part, and a head coacting with said seat, a valve spring coacting with said valve stem to move the valve head toward the valve seat, a valve rotating assembly interposed between said valve spring and said valve stem transmitting the load of said spring to said stem, said assembly including shiftable elements arranged for driving the valve in a rotative direction when subjected to increased spring load in the open position of the valve, and a resilient deflectable member arranged to transmit the increased spring load mainly to said shiftable elements when the valve is in opened position.

10. In combination with a stemmed poppet valve and coil spring closing means for said valve, a valve rotating device interposed between the valve stem and the coil spring closing means having a first part bottoming said coil spring closing means and a second part on said valve stem for rotation therewith, said second part having shiftable elements associated therewith arranged to rotatively drive the valve when subjected to the load of said coil spring closing means, and a deflectable member interposed between said first and second parts arranged to deflect when subjected to increased spring loads during opening of the valve for transferring said increased loads to said shiftable elements thereby causing a rotation of the valve.

11. A small compact poppet valve rotating device comprising a retainer cap having a tapered collar portion and an outturned housing portion, said housing portion having a series of inclined grooves arranged circumferentially around the collar portion, balls riding in said grooves, springs urging said balls toward the shallow ends of the grooves, a valve spring seat having an apertured wall freely disposed around said collar portion of the retainer cap and a skirt on said wall embracing said housing portion of the retainer cap, a dished spring washer between the retainer cap and spring seat having an outer peripheral portion thrusting on said spring seat and an inner peripheral portion thrusting on said retainer cap, said springs urging said balls into snug engagement with said spring washer and said spring washer arranged to be bowed on said balls whenever the spring seat is subjected to increased loads whereby the balls will roll into the deeper ends of the grooves to rotate the retainer cap.

12. A valve rotating device which comprises a retainer adapted to be locked to a valve stem, shiftable elements carried by said retainer adapted to rotate the retainer, a spring valve seat coacting with said retainer, a dished spring washer having an outer peripheral portion seated on said spring seat and an inner peripheral portion normally seated on said retainer, spring means acting on said shiftable elements to urge the same into snug engagement with said washer, and said washer arranged to be deflected under the influence of increased valve spring pressure for transferring the valve spring load to said shiftable elements thereby causing said elements to rotate the retainer.

13. A poppet valve rotating device which comprises a retainer having a tapered collar portion adapted to receive retainer locks therein for securing the retainer to a poppet valve stem, said retainer having an outturned flange portion with a plurality of ball races therein around the collar portion thereof, said flange portion having inturned tangs separating the inclined ball races, coil springs bottomed on said inturned tangs, balls riding on said raceways and acted upon by said coil springs to be urged toward the shallow ends of the raceways, a seat member having a central aperture freely receiving the collar portion of the retainer cap therethrough and a skirt portion embracing the flange of the retainer cup, means on said skirt portion overlying said flange portion of the retainer to hold the parts in assembled relation, and a spring washer having an outer peripheral portion bottomed on said seat member and an inner peripheral portion bottomed on said retainer cap radially inwardly of said balls, said coil springs urging said balls into snug engagement with said spring washer, and said spring washer arranged to be deflected relative to said retainer into thrusting engagement with said balls whenever the load on the spring seat is increased beyond a predetermined amount whereby said increased spring load will be transferred to said balls causing the balls to roll into the deeper ends of the raceways and rotate the retainer.

14. A poppet valve rotating device comprising a retainer having a collar portion adapted to receive retainer locks therein for locking a retainer to a valve stem, said retainer having an outturned flange, a spring seat having a central aperture receiving the collar of the retainer freely therethrough and a plurality of inclined raceways disposed circumferentially around the central aperture thereof, balls in said raceways, springs urging the balls into the shallow ends of the raceways, and a deflectable spring washer having an outer peripheral portion normally thrusting on said spring seat and an inner peripheral portion thrusting on said retainer, said springs urging said balls into snug engagement with said spring washer and said spring washer arranged to deflect relative to said spring seat into increased thrusting engagement with said balls whereby the balls will roll into the deeper ends of the raceways and rotate the washer and retainer.

15. A valve rotating device comprising a spring seat member arranged for corotation with a valve, a non-rotatable part adjacent said seat member, said seat member having shiftable elements associated therewith, springs acting on said shiftable elements, and a deflectable spring washer connecting said seat and said stationary part under normal conditions but adapted to be deflected onto said shiftable elements whenever the poppet valve is opened for causing the shiftable elements to drive the retainer.

16. In combination with a stemmed poppet valve, a part slidably mounting the stem of the valve, and a coil spring secured on the valve stem to move the valve to closed position, a valve rotating device which comprises a member rotatively mounted on said part and receiving the valve spring thereagainst, said member having a plurality of inclined raceways therein, balls in said raceways, springs urging the balls into the shallow ends of the raceways, and a spring washer in the inner peripheral portion bottomed on said part and an outer peripheral portion normally bottomed on said member but arranged to be deflected under increased valve spring loads on said balls for urging the balls into the deeper ends of the raceways thereby rotating the member and rotatively driving the valve stem through the valve spring.

17. In combination with a stemmed poppet valve, a part slidably receiving the valve, a coil spring embracing the valve stem, and a retainer secured on said stem bottoming one end of said spring, a cup member embracing said part and receiving said valve stem therethrough, said cup member having an outturned flange bottoming the other end of the spring, the bottom of said cup member having a plurality of inclined grooves disposed circumferentially around the valve stem, balls in said grooves, means urging the balls toward the shallow ends of the grooves, and a deflectable spring washer connecting the cup member and said part for transferring the spring load to the part when the valve is closed and arranged to be deflected when the valve is opened to transfer the spring load to said balls for causing the balls to rotate the cup member and thereby rotate the spring and valve.

ELDON K. RALSTON.